United States Patent [19]
Inoue et al.

[11] Patent Number: 5,904,052
[45] Date of Patent: May 18, 1999

[54] BRINE TYPE AIR CONDITIONING APPARATUS

[75] Inventors: Yoshimitsu Inoue, Chiryu; Yuichi Shirota, Anjo, both of Japan

[73] Assignee: Denso Corporation, Kariya, Japan

[21] Appl. No.: 08/918,476

[22] Filed: Aug. 26, 1997

[30] Foreign Application Priority Data

Sep. 2, 1996 [JP] Japan ................................. 8-232249
Sep. 17, 1996 [JP] Japan ................................. 8-245065

[51] Int. Cl.⁶ ....................................................... B60H 1/32
[52] U.S. Cl. .................................. 62/244; 62/434; 165/43
[58] Field of Search ............................. 62/244, 434, 435; 165/42, 43

[56] References Cited

U.S. PATENT DOCUMENTS

| | | | |
|---|---|---|---|
| 2,787,129 | 4/1957 | Evans | 62/434 |
| 5,138,851 | 8/1992 | Mardikian | 62/434 |
| 5,259,198 | 11/1993 | Viegas et al. | 62/434 |
| 5,265,437 | 11/1993 | Saperstein et al. | 62/435 |
| 5,330,385 | 7/1994 | Hotta et al. | 165/42 |
| 5,483,807 | 1/1996 | Abersfelder et al. | 62/435 |
| 5,749,235 | 5/1998 | Ueda | 62/434 |

FOREIGN PATENT DOCUMENTS 58-54904 U  4/1983  Japan .

*Primary Examiner*—William E. Tapolcal
*Attorney, Agent, or Firm*—Harness, Dickey & Pierce, PLC

[57] ABSTRACT

According to the present invention, in a brine type air-conditioning apparatus in which brine circulates into an inside cooler to cool a passenger compartment, there are provided a refrigeration cycle using flammable gas as refrigerant, a brine circuit in which the brine circulates, a hot water circuit in which hot water heated by an engine circulates, a front air-conditioning unit for performing an air-conditioning of a front portion in the passenger compartment, a rear air-conditioning unit for performing an air-conditioning of a rear portion in the passenger compartment. In the front air-conditioning unit, there are provided a cooler for cooling conditioned air by using the brine, a heater for heating conditioned air by using the hot water, a blower. In the rear air-conditioning unit, there are provided an air-conditioning heat exchanger for cooling conditioned air by using the brine and for heating conditioned air by using the hot water, and a blower. For adjusting a temperature of the low-temperature side, the heating amount by the heater is set to zero, and a temperature of the brine is variably controlled by varying a capacity of the refrigeration cycle.

11 Claims, 9 Drawing Sheets

FRONT AIR-CONDITIONING UNIT CONTROL

REAR AIR-CONDITIONING UNIT CONTROL

BRINE TYPE AIR CONDITIONING APPARATUS

CROSS-REFERENCE TO RELATED APPLICATIONS

This application is based upon and claims the benefit of priority of the prior Japanese Patent Applications of Nos. Hei. 8-232249 filed on Sep. 2, 1996, and Hei. 8-245065 filed on Sep. 17, 1996, the contents of which are incorporated herein by reference.

BACKGROUND OF THE INVENTION

1. Field of the Invention

The present invention relates to a brine type air conditioning apparatus in which a brine cooled by a brine-refrigerant heat exchanger circulates into a cooler in a passenger compartment to cool the passenger compartment. The present invention is preferably employed for a vehicle.

2. Description of Related Art

Recently, in view of preventing warmth of the earth, there has been proposed an air conditioning apparatus for a vehicle, in which refrigerant in a refrigeration cycle is changed from feron to flammable gas such as propane gas to cool a passenger compartment of the vehicle, as disclosed in JP-U-58-54904.

In the above-described air conditioning apparatus for a vehicle, a cooler (evaporator) for cooling conditioned air by latent heat of evaporation of the flammable gas is disposed in a passenger compartment; and therefore, the flammable gas may be leaked into the passenger compartment as a closed space from a pipe connecting portion of the cooler, or the like.

To prevent the gas from leaking into the passenger compartment, the inventors of the present invention have developed a brine type air conditioning apparatus in which a brine-refrigerant heat exchanger is disposed in an engine compartment (a space opened to the atmosphere) outside the passenger compartment, brine (water to which a compound for decreasing a freezing temperature is added) is temporarily cooled in the brine-refrigerant heat exchanger, and this low-temperature brine circulates into a cooler disposed in the passenger compartment to cool the passenger compartment.

In the brine type air conditioning apparatus, the inventors have examined, as a temperature control system for controlling a temperature of air blown into the passenger compartment, a system for adjusting a heating amount in a heater using hot water (engine cooling water) usually employed in a vehicle, e.g., an air-mixing type for adjusting a ratio of an amount of cool air and an amount of warm air.

According to this temperature control system, after the conditioned air is cooled and dehumidified by the low-temperature brine, a temperature of which is lowered down to approximately 0° C., the cooled air is re-heated up to a desired temperature; and therefore, it is preferable in view of the air-conditioning function. However, as the refrigeration cycle, since the brine is always cooled down to approximately 0° C., when the re-heating amount in the heater becomes large as in the intermediate seasons of spring and fall, the consumed energy in the refrigeration cycle may be increased wastefully.

SUMMARY OF THE INVENTION

The present invention has been accomplished in view of the above-mentioned problem, and an object of the present invention is to reduce the consumed energy in the refrigeration cycle in the brine type air conditioning apparatus in which the brine cooled in the refrigeration cycle circulates into the cooler in the passenger compartment to cool the passenger compartment.

According to the present invention, in a brine type air-conditioning apparatus in which brine circulates into an inside cooler to cool a compartment, there are provided a refrigeration cycle using flammable gas as refrigerant, a brine circuit in which the brine circulates, a hot water circuit in which hot water circulates, a first air-conditioning unit for performing an air-conditioning of a first area in the compartment, a second air-conditioning unit for performing an air-conditioning of a second area in the passenger compartment. In the first air-conditioning unit, there are provided a cooler for cooling conditioned air by using the brine, a heater for heating conditioned air by using the hot water, a first blower for blowing air. In the second air-conditioning unit, there are provided an air-conditioning heat exchanger for cooling conditioned air by using the brine and for heating conditioned air by using the hot water, and a second blower for blowing air. When a target temperature of air to be blown into the compartment is lower than a predetermined temperature, a capacity of the refrigeration cycle is variably changed and a temperature of the brine in the brine circuit is variably changed, so that a temperature control of the low-temperature side is performed in the first and second air-conditioning units. After the target temperature of air to be blown into the compartment is increased up to the predetermined temperature, a heating amount of the heater is controlled so that a temperature control of the high-temperature side is controlled in the first air-conditioning unit, and a flow into the air-conditioning heat exchanger is switched between the brine in the brine circuit and the hot water in the hot water circuit so that a temperature control of the high-temperature side is controlled in the second air-conditioning unit.

In this way, because the refrigeration cycle using the flammable gas as the refrigerant can be disposed outside the compartment, there is no possibility that the flammable gas may leak into the compartment.

Further, as for the temperature control of the low-temperature side, the temperature of the brine is variably changed by varying the capacity of the refrigeration cycle; and therefore, as compared with the system where the brine is always cooled down to the low-temperature, i.e., approximately 0° C., it is possible to reduce the consumed energy of the refrigeration cycle as much as the temperature of the brine is changed (increased).

In addition, in the first air-conditioning unit, by the combination of the control of the temperature of the brine flowing into the cooler and the control of the heating amount of the heater, it is possible to satisfactorily control the temperature of the compartment from the low-temperature area (cooling operation side) to the high-temperature area (heating operation side), and in the second air-conditioning unit, by the combination of the control of the temperature of the brine flowing into the air-conditioning heat exchanger and the switching introduction between the brine and the hot water, it is possible to satisfactorily control the temperature of the compartment from the low-temperature area (cooling operation side) to the high-temperature area (heating operation side). Especially, in the second air-conditioning unit, by using the single air-conditioning heat exchanger both for cooling operation and heating operation, a wide range of the temperature control can be performed with the simple construction.

Further, there may be employed a humidity sensor for detecting a humidity in the compartment. In this case, a dehumidifying limit temperature is set according to the humidity detected by the humidity sensor as the predetermined temperature, and when the temperature control of the high-temperature side is performed, the capacity of the refrigeration cycle is controlled such that the temperature of the cooler is maintained at the dehumidifying limit temperature.

Thus, when the temperature control of the high-temperature side is performed, the temperature of the cooler is maintained at the dehumidifying limit temperature so that the necessary minimum dehumidifying capacity can be secured, with the result that the windshield is prevented from being fogged.

Further, there may be employed a heat-accumulating tank for accumulating low-temperature brine in the brine circuit. In this case, the low-temperature brine in the heat-accumulating tank circulates into the cooler and the air-conditioning heat exchanger at a start of a cooling operation. In this way, it is possible to enhance the responsibility of the cooling operation.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Embodiments according to the present invention will be described hereinafter with reference to the drawings.

Figure 1:
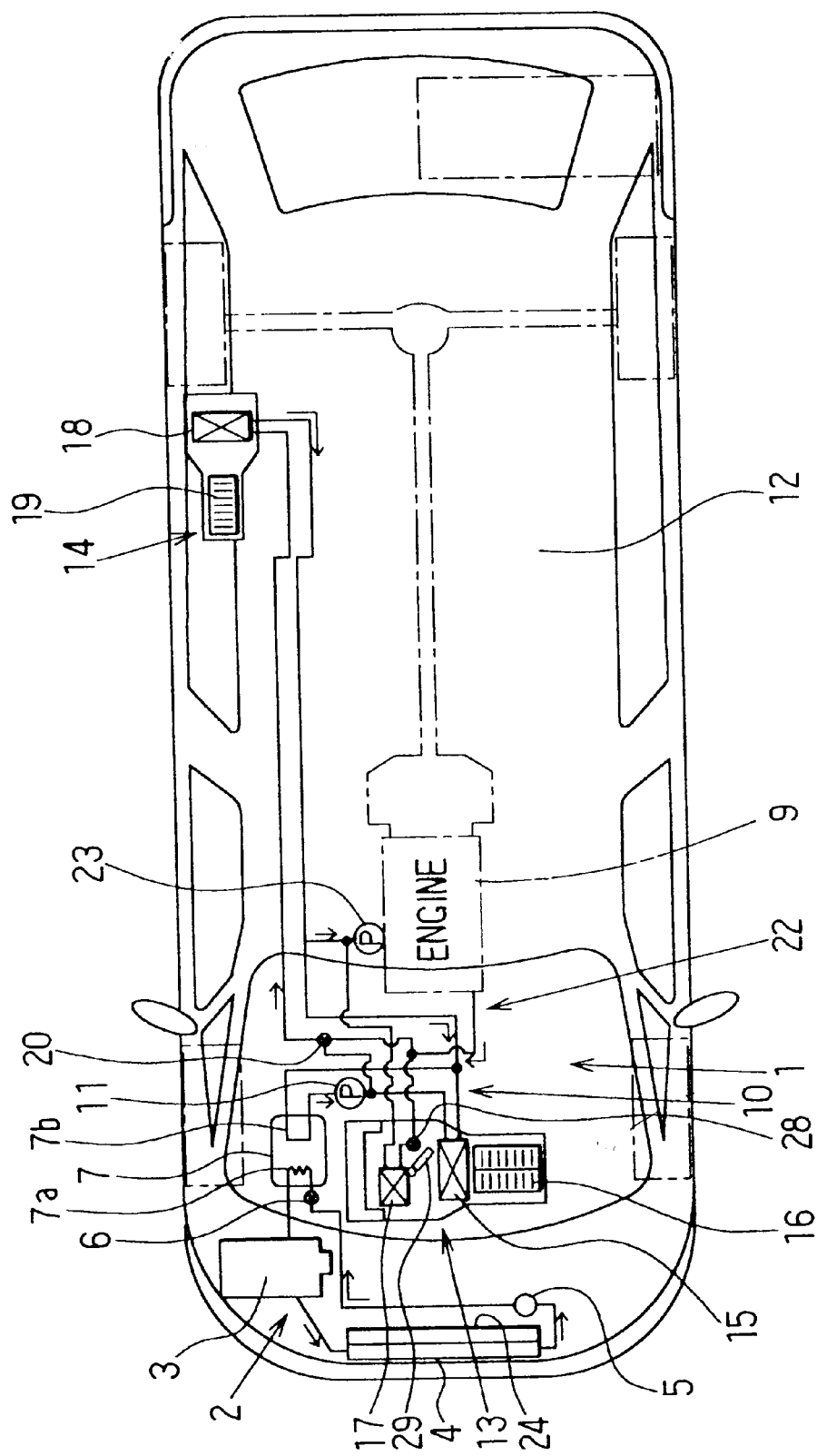
FIG. 1 is a plan view schematically showing a layout of an air-conditioning apparatus mounted on a vehicle according to a first embodiment of the present invention.

A first embodiment will be described with reference to FIGS. 1 to 6. FIG. 1 is a plan view schematically showing a layout of an air-conditioning apparatus mounted on a vehicle. An engine 9 for driving the vehicle is mounted under a floor of a passenger compartment of the vehicle, and an engine compartment 1 is formed there. In the engine compartment 1 under the floor, there is provided a refrigeration cycle 2 using flammable gas such as propane gas, as refrigerant.

The refrigeration cycle 2 is equipped with a compressor 3 for compressing and discharging the refrigerant, and a condenser 4 cools and condenses gaseous refrigerant discharged from the compressor 3. The refrigerant from the condenser 4 is accumulated in a receiver 5, and liquid refrigerant is separated from gaseous refrigerant therein. The liquid refrigerant from the receiver 5 is decompressed by an expansion valve 6 and becomes liquid-gas two-phase state.

The refrigerant decompressed by the expansion valve flows into a brine-refrigerant heat exchanger 7 and is evaporated while receiving heat from brine therein to cool the brine. The gaseous refrigerant evaporated in the heat exchanger 7 is sucked into the compressor 3 again and compressed.

The brine is of anti-freeze liquid in which a compound for decreasing a freezing temperature, such as anti-rust compound, is added to water, and may be same as engine cooling water circulating in a hot water circuit 22 (described later).

Figure 2:
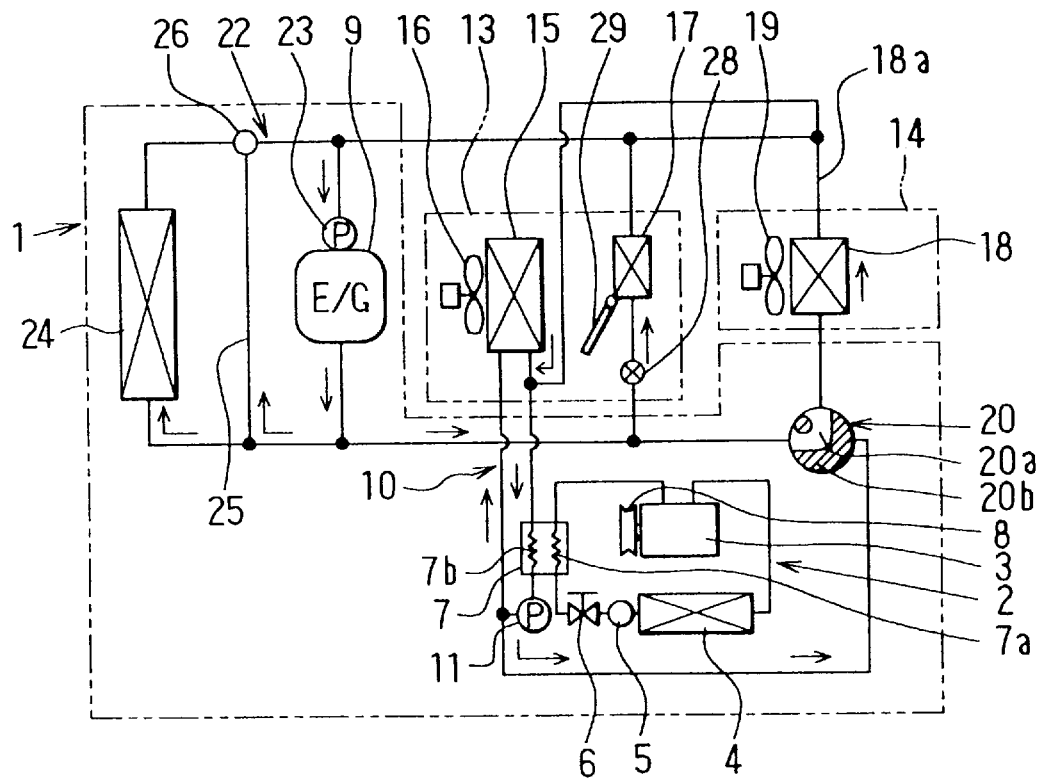
FIG. 2 is a circuit view showing a refrigeration cycle, a hot water circuit, and a brine circuit in the first embodiment.

In FIGS. 1 and 2, the compressor 3 is shown as to be apart from the engine 9; however, actually, the compressor 3 is disposed adjacent to the engine 9 and is actuated by a rotational driving force of the engine 9 through an electro-magnetic clutch 8 (FIG. 2).

The brine-refrigerant heat exchanger 7 includes a refrigerant passage portion 7a and a brine passage portion 7b disposed to be able to perform heat-exchange with the refrigerant passage portion 7a.

Next, a brine circuit 10 in which the brine cooled in the brine-refrigerant heat exchanger circulates will be described. In the brine circuit 10, an electric pump 11 for pumping the brine is disposed in an engine compartment to be adjacent to the brine-refrigerant heat exchanger 7.

Further, around a dashboard of a front portion in the passenger compartment of the vehicle, there is provided a front air conditioning-unit (first air-conditioning unit) 13. At a rear portion in the passenger compartment, there is provided a rear air-conditioning unit 14. The front air-conditioning unit 13 is equipped with a cooler 15 for cooling air by using the low-temperature brine (cool water) circulating in the brine circuit 10, a blower 16 of an electric type, and a heater 17. The heater 17 is disposed at a downstream side of the cooler 15 with reference to air flow direction. The heater 17 is for re-heating air by using the cooling water (hot water) of the engine 9 as heat source. The conditioned air, a temperature of which has been adjusted while passing through the heater 17, is blown into the front side (first space) in the passenger compartment.

The rear air-conditioning unit 14 is equipped with an air-conditioning heat exchanger 18 both for cooling and heating air. The air-conditioning heat exchanger 18 cools air when the low-temperature brine circulating into the brine circuit 10. In the brine circuit 10, the air-conditioning unit 14 is disposed in parallel with the cooler of the front air-conditioning unit 13. In the rear air-conditioning unit 14, thee is disposed a blower 19 of an electric type, and the air blown by the blower 19 is heat-exchanged with the air-conditioning heat exchanger 18 to be cooled or heated and then is blown into the rear side of the passenger compartment.

Since the air-conditioning heat exchanger 18 is both for cooling and heating air, a cool water/hot water switching valve 20 is disposed at a water inlet side of the air-conditioning heat exchanger 18 so that the engine cooling water (hot water) from the hot water circuit 22 and the low-temperature brine from the brine circuit 10 can be selectively introduced into the air-conditioning heat exchanger 18 by the switching valve 20.

Therefore, there is provided a common passage portion 18a through which both of the hot water and the brine flow into the air-conditioning heat exchanger 18. Of this common passage portion 18a, in a joining point of the hot water circuit 22 and the brine circuit 10, at an inlet side of the air-conditioning heat exchanger 18, there is provided the cool water/hot water switching valve 20.

Figure 3A:
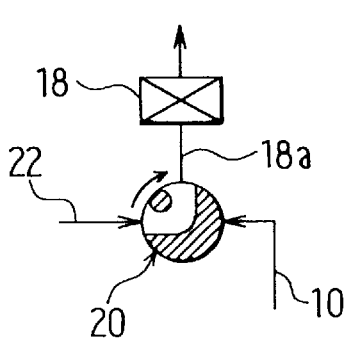
FIGS. 3A–3C are operation explanatory views of a hot water/cool water switching valve in the first embodiment.
Figure 3B:
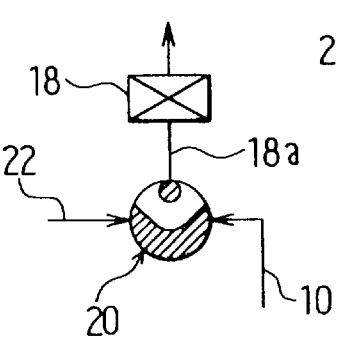
Figure 3C:
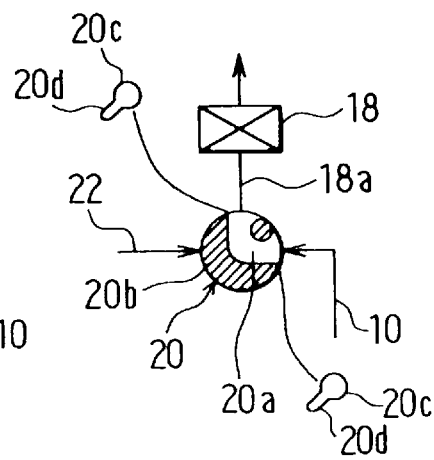

The cool water/hot water switching valve 20 is opened or closed by an electric actuator such as a motor. In this embodiment, a valve element (rotor) 20b having a passage 20a which is bent perpendicularly as shown in FIGS. 2 and 3A–3C is rotated to switch the passages and to adjust each amount of the hot water and the low-temperature brine. For adjusting the flow amount, a cross section of the passage 20a in the valve element 20b is formed in a shape in which a circular large area portion 20c and a long and narrow small area portion 20d are connected along a circumferential direction of an outer circumferential surface of the valve element 20b in the maximum cooling operation as shown in FIGS. 3A to 3C.

Next, the hot water circuit 22 in which the engine cooling water circulates will be described.

The engine 9 is of a water-cooled type and functions as a hot water source. In the hot water circuit 22, there are provided a water pump 23 directly actuated by the engine 9, a radiator in which the engine cooling water circulates by the water pump 23, and a bypass circuit 25 disposed in parallel with the radiator 24.

At a joining point of the cooling water from the radiator 24 and the bypass circuit 25, there is provided a thermostat (temperature sensing valve) 26 for switching a flow of the cooling water. When the temperature of the cooling water becomes equal to or higher than a predetermined temperature (e.g., 80° C.), the thermostat 26 opens the passage leading to the radiator 24, and the cooling water is cooled by the radiator 24. In the front air-conditioning unit 13, there is provided at a cooling water inlet side of the heater 17 an opening and closing valve 28 of an electric type, for intermitting the cooling water flowing into the heater 17.

In an air flow passage of the front air-conditioning unit 13, there is provided an air-mixing door 29 for adjusting a ratio of an amount of the hot air passing through the heater 17 and an amount of cool air bypassing the heater 17. The air-mixing door 29 functions as heating amount control means (temperature control means) for controlling an heating amount against the air having passed through the cooler 15 to adjust a temperature of the air blown into the passenger compartment. The air-mixing door 29 is opened and closed by an electric actuator such as a motor.

Figure 4:
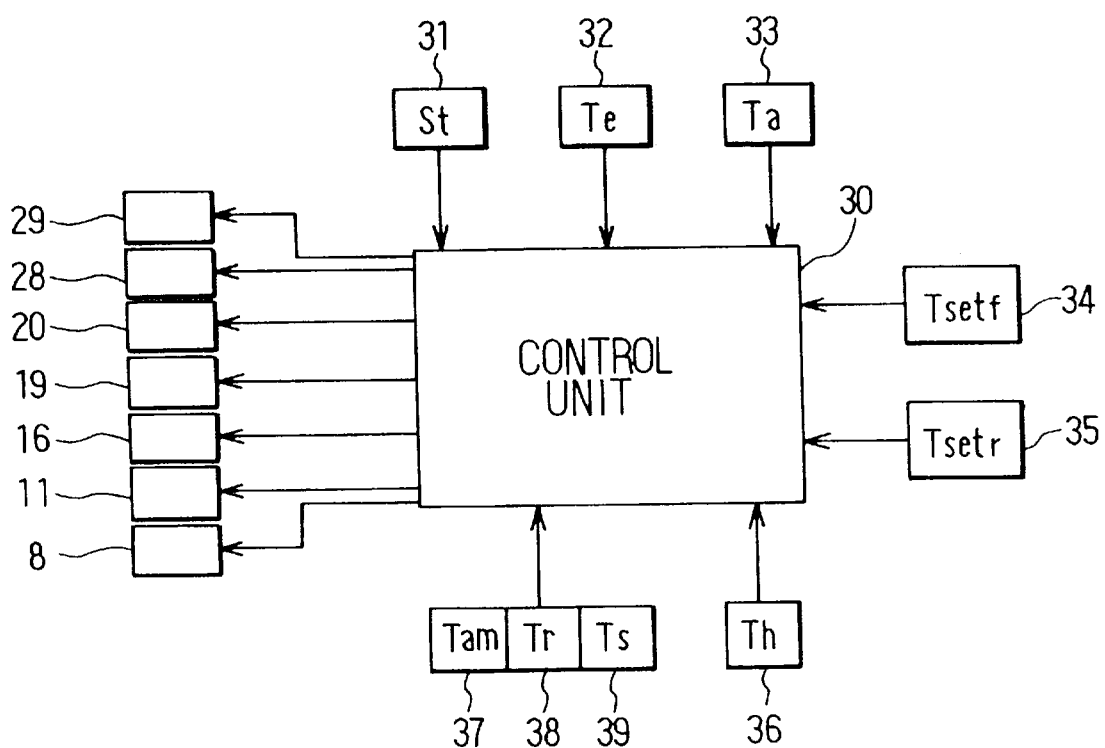
FIG. 4 shows an electric control system in the first embodiment.

FIG. 4 is an electric control block diagram. The air-conditioning electronic control unit 30 is constructed by a microcomputer and signals from sensors (described later) and the like are input thereto. The air-conditioning electronic control unit 30 performs a calculation based on the input signals and controls each of the above-described air-conditioning components 8, 11, 16, 19, 20, 28, and 29.

A humidity sensor 31 is disposed around the dashboard at the front portion in the passenger compartment to detect a humidity St at the front portion in the passenger compartment. A cooler temperature sensor 32 is disposed in the air passage at immediately after the cooler 15 to detect a temperature Te of the air having just passed through the cooler 15. A heater blown-out air temperature sensor 33 is disposed in the air passage at immediately after the heater 17 to detect a temperature Ta of the air having just passed through the heater 17.

A front temperature setting unit 34 of the front portion in the passenger compartment is provided on an air-conditioning operation panel (not shown) disposed around the dashboard in the passenger compartment and is for setting a set temperature Tsetf of the front portion in the passenger compartment. Further, a rear temperature setting unit 35 of the rear portion in the passenger compartment is provided on the air-conditioning operation panel or an air-conditioning panel (not shown) disposed outside a case of the rear air-conditioning unit 14 and is for setting a set temperature Tsetr of the rear portion in the passenger compartment.

An air-conditioning heat exchanger blown-air temperature sensor 36 is disposed in the air passage at immediately after the air-conditioning heat exchanger 18 to detect a temperature Th of the air having just passed through the air-conditioning heat exchanger 18. In addition, there are provided an outside air temperature 37, an inside air temperature 38, and a sunlight amount sensor 39, for detecting a temperature Tam of outside air, a temperature Tr of air in the passenger compartment (inside air), and an amount Ts of the sunlight, respectively.

Figure 5:
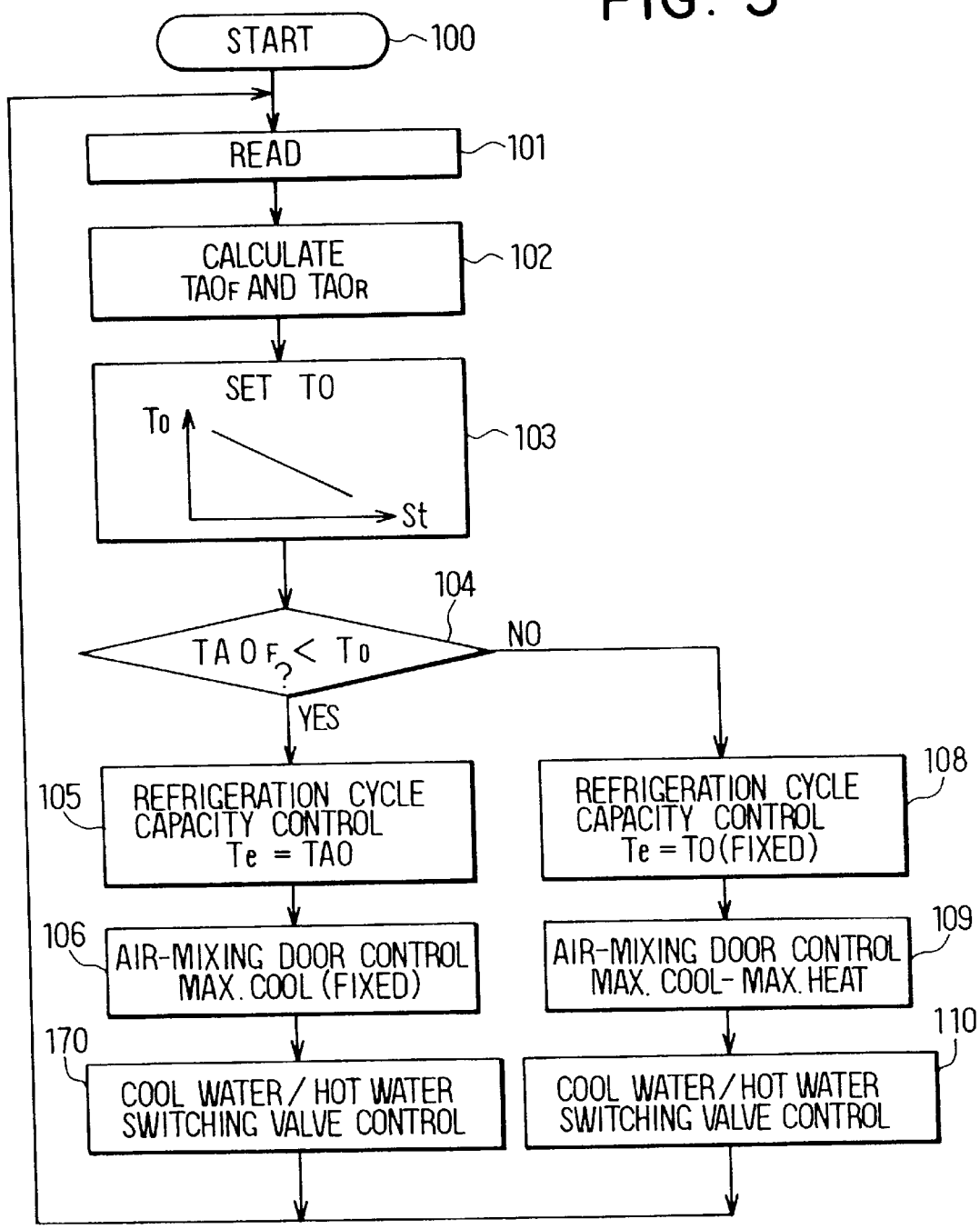
FIG. 5 is a flow chart for explaining an operation in the first embodiment.

An operation according to the above-described construction will be described. When an automatic operation state of the air-conditioning apparatus is set by an operation of the switch on the air-conditioning operation panel, an automatic control process of the air-conditioning apparatus at step 100 in a flow chart of FIG. 5 is started. At next step 101, signals from various sensors of FIG. 4 are read.

At next step 102, a front side target blown-air temperature $TAO_F$ of the air blown out into the front-side portion in the passenger compartment and a rear side target blown-air temperature $TAO_R$ of the air blown out into the rear-side portion in the passenger compartment will be calculated by using the following formulas (1) and (2).

$$TAO_F = Kset \times Tsetf - Kr \times Tr - Kam - Ks \times Ts + C \quad (1)$$

$$TAO_R = Kset \times Tsetr - Kr \times Tr - Kam - Ks \times Ts + C \quad (2)$$

Wherein, Kset is a temperature setting gain, Kr is an inside air temperature gain, Kam is an outside air temperature gain, Ks is a sunlight amount gain, and C is a correcting constant.

At next step 103, a dehumidifying limit temperature To is set based on the humidity St detected by the humidity sensor 31. The dehumidifying limit temperature To is for being set to secure the necessary minimum dehumidifying capacity by the cooler 15 of the front air-conditioning unit 13. When the dehumidifying capacity by the cooler is insufficient, there occurs a problem in that the windshield of the vehicle is fogged.

The dehumidifying limit temperature To is set to have a relationship as to be in inverse proportion to the humidity St. That is, the humidity limit temperature To decreases in accordance with an increase of the humidity St.

At next step 104, it is determined whether or not the front side target blown-air temperature $TAO_F$ in is lower than the humidity limit temperature To. When the determination is "YES", the capacity of the refrigeration cycle 2 is controlled such that the temperature Te of the air having just passed through the cooler 15 is set to the front side target blown-air temperature $TAO_F$.

That is, when the temperature Te of the air becomes lower than the temperature of the front side target blown-air temperature $TAO_F$, a supply of an electric current to the electromagnetic clutch 8 is interrupted to stop the compressor 3. On the other hand, when the temperature Te of the air becomes higher than the temperature of the front side target blown-air temperature $TAO_F$, an electric current is supplied to the electromagnetic clutch 8 to operate the compressor 3. By intermitting the operation of the compressor 3, the capacity of the refrigeration cycle 2 is controlled, with the result that the temperature of the brine in the brine circuit 10 varies and the temperature Te of the air is controlled.

At next step 106, the air-mixing door 29 is controlled to the maximum cooling position (where the passage leading to the heater 17 is fully closed and the bypass passage bypassing the heater 17 is fully opened). Simultaneously, the opening and closing valve 28 is closed, and the hot water flowing into the heater 17 is interrupted.

As a result, the heating amount by the heater 17 becomes zero; and therefore, the conditioned air blown by the blower 16 having been cooled to the front side target blown-air temperature $TAO_F$ is blown into the front-side portion in the passenger compartment without being re-heated by the heater 17 and with maintaining the temperature to perform an air-conditioning of the front-side portion in the passenger compartment.

At next step 107, a rotational angle (opening degree) of the cool water/hot water switching valve 20 is controlled such that the temperature Th of the air having just passed through the air-conditioning heat exchanger 18 of the rear air-conditioning unit 14 is set to the front side target blown-air temperature $TAO_F$.

By adjusting the rotational angle of the cool water/hot water switching valve 20, as shown in FIGS. 3A–3C, it is possible to switch between the brine (cool water) and the hot water and to adjust the flow amount. Therefore, the temperature Th of the air having just passed through the air-conditioning heat exchanger 18 can be controlled by the function for switching between the cool water and the hot water and the function for adjusting the flow amount.

When the front side target blown-air temperature $TAO_F$ for the front-side portion in the passenger compartment is lower than the dehumidifying limit temperature To, the temperature of the brine varies by the capacity control of the refrigeration cycle 2, as described above. Accordingly, even if the cool water/hot water switching valve 20 is maintained to the maximum cooling position as shown FIG. 3C, the temperature of the brine flowing into the air-conditioning heat exchanger 18 varies in accordance with a variation of the front side target blown-air temperature $TAO_F$. Therefore, the temperature Th of the air having just passed through the air-conditioning heat exchanger 18 is basically changed by the variation of the temperature of the brine flowing thereinto, so that the temperature control can be performed (see FIG. 6C).

Figure 6A:
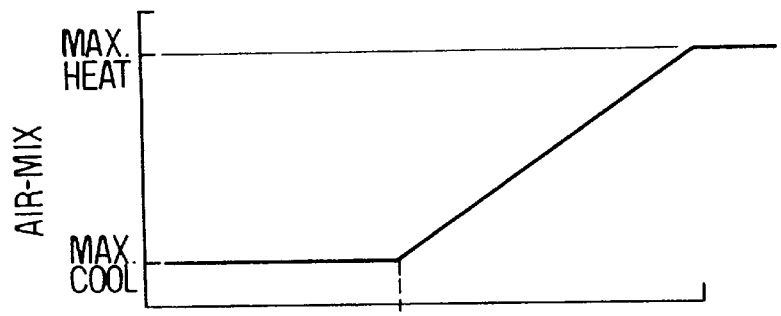
FIGS. 6A–6C are graphs for explaining the operation in the first embodiment.

In a region where the front side target blown-air temperature $TAO_F$ for the front-side portion in the passenger compartment is lower than the dehumidifying limit temperature To, i.e., in a temperature control area of the low temperature side, as shown in FIG. 6A, the temperature of the brine of the brine circuit 10 is variably changed while the air-mixing door 29 is maintained to the maximum cooling position, and the temperature Te of the air having just passed through the cooler 15 and the temperature Th of the air having just passed through the air-conditioning heat exchanger 18, so that the temperature of the air blown into the passenger compartment can be controlled.

Accordingly, the higher the front side target blown-air temperature $TAO_F$ for the front-side portion in the passenger compartment becomes toward the dehumidifying limit To, the longer the time period during which the compressor 3 is stopped becomes (the operating ratio of the compressor 3 lowers), with the result that the consumed energy of the refrigeration cycle can be reduced.

In the rear air-conditioning unit 14, when the temperature Th of the air having just passed through the air-conditioning heat exchanger 18 is controlled by the variation of the temperature of the brine flowing into the air-conditioning heat exchanger 18 while the flow amount of the brine is maintained at the maximum flow amount state, the air temperature Th may not be controlled to the rear side target blown-air temperature $TAO_R$ for the rear-side portion in the passenger compartment (for example, when the set temperature Tsetr of the rear-side portion in the passenger compartment is greatly different from the set temperature Tsetf of the front-side portion in the passenger compartment). In such a case, the amount of the brine flowing into the air-conditioning heat exchanger 18 may be adjusted by the cool water/hot water switching valve 20.

Next, at step 104, it is determined that the front-side target blown-air temperature $TAO_F$ for the front-side portion in the passenger compartment is higher than the dehumidifying limit temperature To, it proceeds to the step 108, the capacity of the refrigeration cycle 2 is controlled such that the temperature Te of the air having just passed through the cooler 15 is maintained at the dehumidifying limit temperature To.

That is, by intermitting the operation of the compressor 3, the capacity of the refrigeration cycle 2 is controlled, and the air temperature Te is maintained at the dehumidifying limit temperature To. In this way, the minimum dehumidifying capacity required for preventing the windshield from being fogged can be secured, so that the windshield can be prevented from being fogged.

Figure 6B:
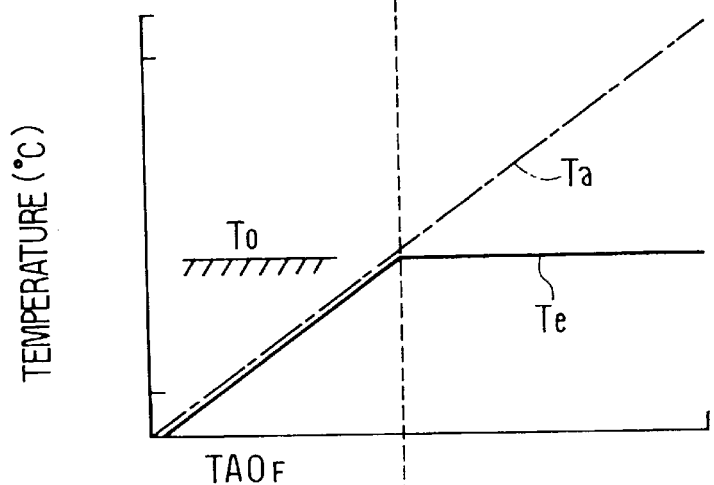

At next step 109, the opening degree of the air-mixing door 29 is adjusted such that the temperature Ta of the air having just passed through the heater 17 is set to the front side target blown-air temperature $TAO_F$ for the rear-side portion in the passenger compartment. That is, as shown in FIGS. 6A and 6B, by adjusting the opening degree of the air-mixing door 29, the heating amount by the heater 17 is adjusted, and the temperature Ta of the air having just passed through the heater 17 is controlled. In this way, the temperature control of the high-temperature side in the front air-conditioning unit 13 can be performed. The opening and closing valve 28 is opened when the air-mixing door 29 is rotated at the other positions than the maximum cooling position, and the hot water circulates into the heater 17 of the front air-conditioning unit 13.

Figure 6C:
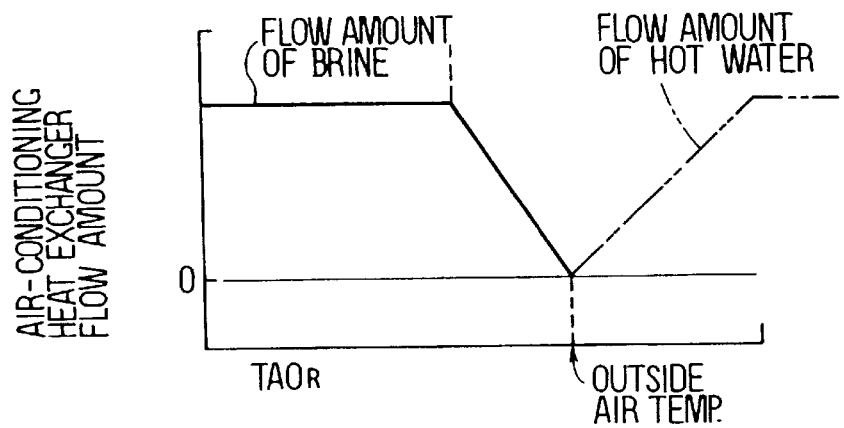

At next step 110, the rotational angle of the cool water/hot water switching valve 20 is controlled such that the temperature Th of the air having just passed through the air-conditioning heat exchanger 18 is set to the rear side target blown-air temperature $TAO_R$. In the control at step 110, as shown in FIG. 6C, firstly, the valve element 20b of the cool water/hot water switching valve 20 is rotated in an anticlockwise direction, from the maximum cooling position of FIG. 3C, so that the flow amount of the brine is reduced and the temperature Th of the air having just passed through the air-conditioning heat exchanger 18 is increased.

Then, when the rear side target blown-air temperature $TAO_R$ becomes a temperature corresponding to the outside air temperature Tam, the valve element 20b of the cool water/hot water switching valve 20 is rotated up to the position of FIG. 3B, i.e., the cool water/hot water switching valve 20 is closed, and the inlet side of the common passage portion 18a of the air-conditioning heat exchanger 18 is interrupted from both of the brine circuit 10 and the hot water circuit 22.

When the rear side target blown-air temperature $TAO_R$ becomes higher than the outside air temperature Tam, the valve element 20b of the cool water/hot water switching valve 20 is further rotated in an anticlockwise direction, from the closed valve position, and the inlet side of the common passage portion 18a of the air-conditioning heat exchanger 18 is connected to the hot water circuit 22. In this way, the hot water starts to flow into the air-conditioning heat exchanger 18, and the flow amount of the hot water is increased in accordance with an increase of the rear side target blown-air temperature $TAO_R$, so that the temperature Th of the air having just passed through the air-conditioning heat exchanger 18 is controlled to the rear side target blown-air temperature $TAO_R$.

The brine outlet side (upper end side of FIG. 1) of the air-conditioning heat exchanger 18 in the rear air-conditioning unit 14 is always connected to the hot water circuit 22; however, in the cooling operation, the hot water does not flow from the hot water circuit 22 to the air-conditioning heat exchanger 18. Further, because the air-conditioning heat exchanger 18 is connected to the hot water circuit 22 through a long hot water pipe, the temperature of the air-conditioning heat exchanger 18 may not be increased by heat conduction from the hot water circuit 22.

When it is not necessary to perform an air-conditioning of the rear-side portion in the passenger compartment, the blower 19 in the rear air-conditioning unit 14 may be stopped.

Figure 7:
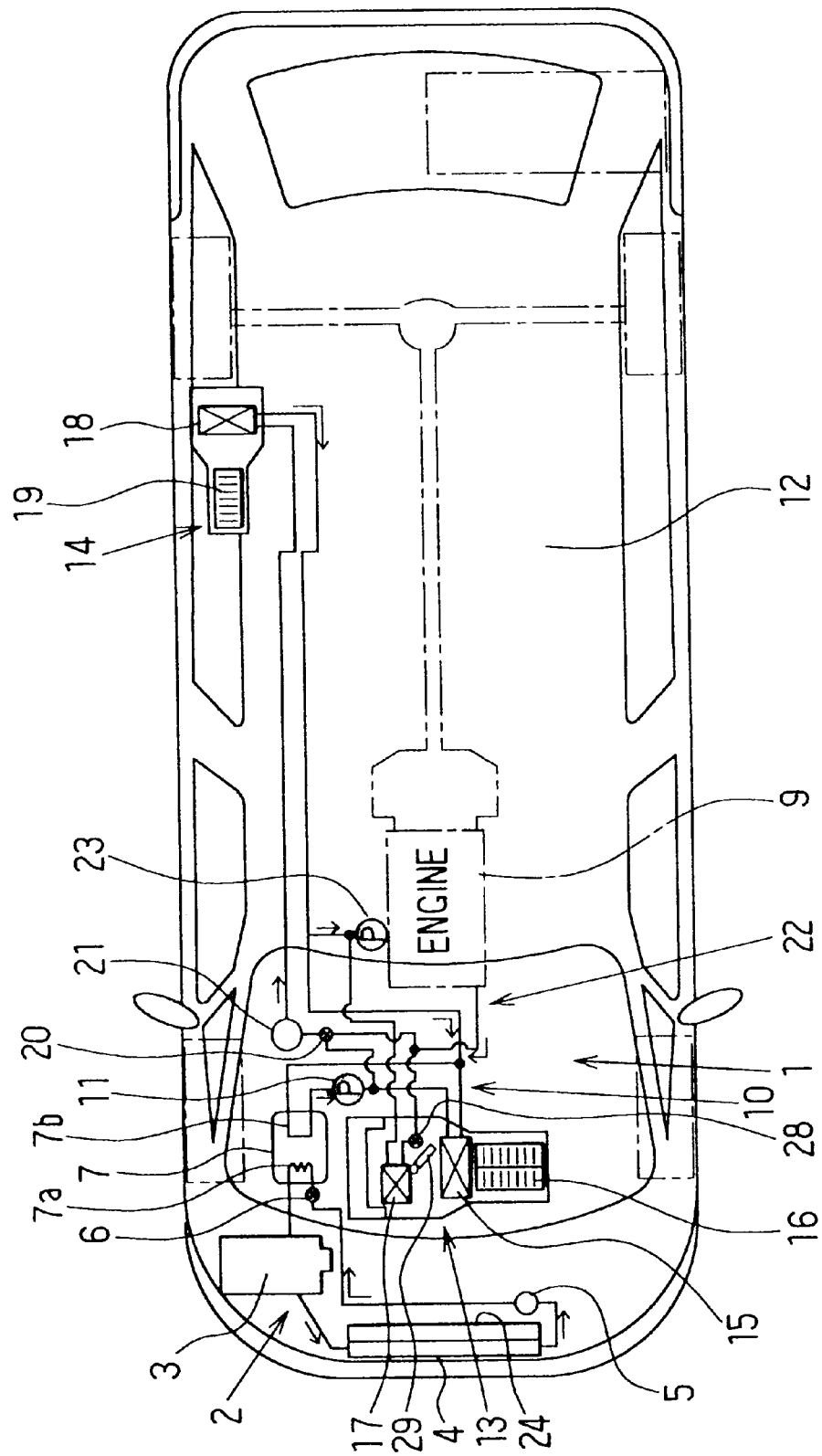
FIG. 7 is a plan view schematically showing a layout of an air-conditioning apparatus mounted on a vehicle according to a second embodiment of the present invention.

A second embodiment of the present invention will be described with reference to FIGS. 7 to 9. In this embodiment, only different features from the first embodiment will be described.

Figures 8A, 8B:
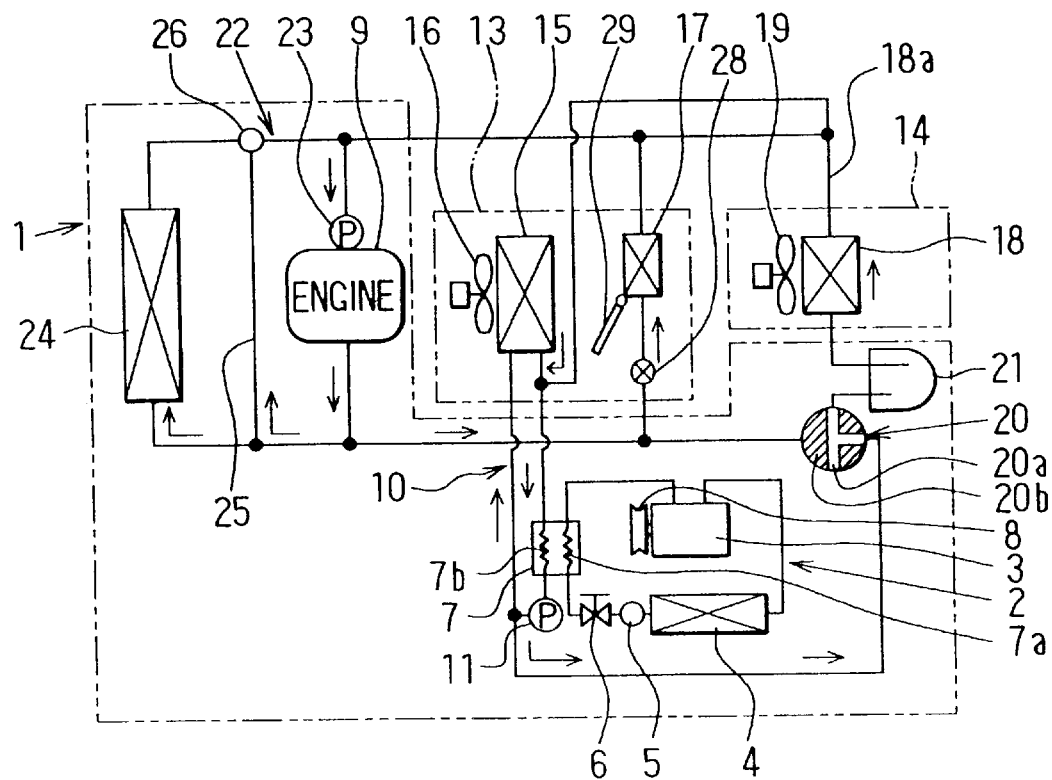
FIG. 8A is a circuit view showing a refrigeration cycle, a hot water circuit, and a brine circuit in the second embodiment.
FIG. 8B is a partial circuit view showing another operational position of a cool water/hot water switching valve in FIG. 8A.
Figure 9:
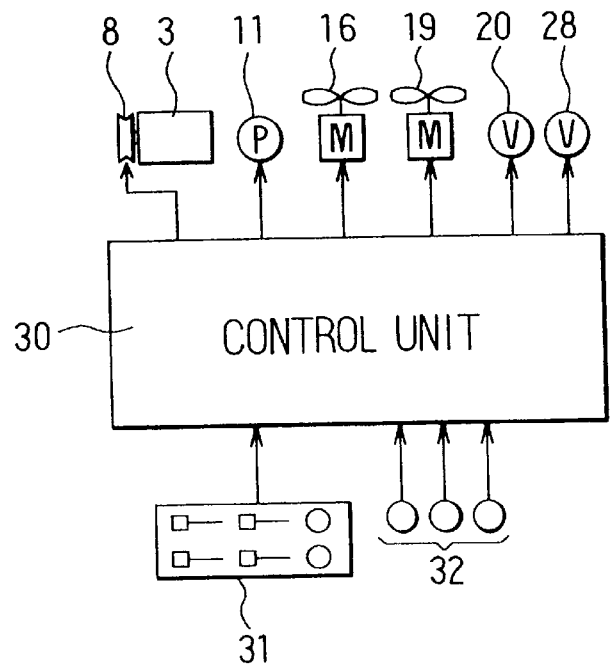
FIG. 9 shows an electric control system in the second embodiment.

In the second embodiment, the cool water/hot water switching valve 20 has a valve element (rotor) 20b having a T-shaped passage 20b as shown in FIGS. 8A and 8B, and a heat-accumulating tank 21 for accumulating low-temperature brine is disposed between the cool water/hot water switching valve 20 and the air-conditioning heat exchanger 18.

An operation according to the above-described construction will be described. In summer season, when a cooling operation is set based on operations of switches on the air-conditioning operation panel 30 and sensor detection signals, the electromagnetic clutch 8 is turned on, the compressor 1 is actuated, and the refrigeration cycle 2 operates. Further, the valve element 20b of the cool water/hot water switching valve 20 is operated such that the inlet side of the common passage portion 18a of the air-conditioning heat exchanger 18 is connected to the brine circuit 10 as shown in FIG. 7, and the water pump 11 of the brine circuit 10 operates.

In the other operations than the maximum cooling operation, the opening and closing valve 28 is opened; and therefore, the hot water circulates into the heater 17 of the front air-conditioning unit 13.

By the operation of the refrigeration cycle, in the brine-refrigerant heat exchanger 7, evaporation latent heat of the refrigerant is absorbed by the brine in the brine circuit 10, and the brine is cooled.

Further, by the operation of the water pump 11, in the brine circuit 10, the brine circulates in a closed circuit passing through the cooler 15 of the front air-conditioning unit 13, the brine-refrigerant heat exchanger 7, and the water pump 11 in this order, and the brine also circulates in a closed circuit passing through the cool water/hot water switching valve 20, the heat-accumulating tank 21, the air-conditioning heat exchanger 18 of the rear air-conditioning unit 14, the brine-refrigerant heat exchanger 7, and the water 11 in this order.

Accordingly, by operating the blowers 16 and 19, the air blown by these blowers are cooled by the cooler 15 and the air-conditioning heat exchanger 18, the front-side portion and the rear-side portion in the passenger compartment can be cooled. Further, in the front air-conditioning unit, the air amount ratio of the cool air and the warm air is adjusted by the opening degree of the air-mixing door 29, and the re-heating amount by the heater 17 is adjusted, so that the temperature of the air blown into the passenger compartment can be adjusted.

Here, the brine is composed of the water having a low freezing temperature and has a large thermal capacity; and therefore, it takes time to cool the brine when the cooling operation is started. However, because the brine having been cooled during the last cooling operation is accumulated in the heat-accumulating tank 21 while being maintained at a low temperature, the low-temperature brine in the heat-accumulating tank 21 is pushed out toward the air-conditioning heat exchanger 18 by the operation of the water pump 11, so that the cooling capacity for the rear-side portion in the passenger compartment at a start of the cooling operation can be increased.

Further, after having passed through the air-conditioning heat exchanger 18, the brine of the heat-accumulating tank 21 is mixed with the brine flowing out of the cooler 15 of the front air-conditioning unit 13. Then, the brine passes through the brine-refrigerant heat exchanger 7 and is sucked into the water pump 11. Accordingly, because the water pump 11 discharges the mixed brine, a mixture of the low-temperature brine in the heat-accumulating tank 21 and the brine outside the heat-accumulating tank 21 circulates into the cooler 15. In this way, the cooling capacity for the front-side portion in the passenger compartment at the start of the cooling operation can be also increased.

As for the cooler 15 of the front air-conditioning unit 13, the rise effect at the start of the cooling operation may be slightly lowered as compared with the air-conditioning heat exchanger 18 of the rear air-conditioning unit 14, because the brine in the heat-accumulating tank 21 circulates while being mixed with the brine outside the heat-accumulating tank 21.

At the start of the cooling operation, the flow control valve 28 is closed, and the air-mixing door 29 is rotated to fully close the passage at the side of the heater 17. In this way, the re-heating amount by the heater 17 is set to zero (the warm air amount is zero) to perform the maximum cooling operation.

When it is not necessary to perform an air-conditioning of the rear-side portion in the passenger compartment, the blower 19 in the rear air-conditioning unit 14 may be stopped. In this case, there is no heat-exchange in the air-conditioning heat exchanger 18, and the air-conditioning heat exchanger 18 functions as a brine passage simply.

In an intermediate season such as spring and fall, a dehumidifying/heating operation is set based on operations of switches on the air-conditioning operation panel 30 and sensor detection signals. In the dehumidifying/heating operation, when the temperature of the air blown into the passenger compartment is on a comparatively low temperature side, which is lower than a predetermined temperature, an operation of each component is set in the same manner as in the cooling operation, except that the air-mixing door 19 is opened by a slight opening degree.

By opening the air-mixing door 29, a part of the blown-air passes through the passage at the side of the heater 17 while being heated therein and becomes warm air. In this way, the cool air having been cooled temporarily in the cooler 15 of the front air-conditioning unit 13 is re-heated to a predetermined temperature by the heater 17, so that the dehumidifying/heating operation can be performed.

Because the rear air-conditioning unit 14 is not equipped with the heater, the dehumidifying/heating operation cannot be performed. Therefore, in the rear air-conditioning unit 14, only the cooling operation by the air-conditioning heat exchanger 18 can be performed, and the cooling capacity can be adjusted by adjusting the air amount of the blower 19.

In the dehumidifying/heating operation, when the temperature of the air blown into the passenger compartment is on a comparatively high temperature side, which is higher than the predetermined temperature, the inlet side of the common passage portion 18*a* of the air-conditioning heat exchanger 18 of the rear air-conditioning unit 14 is interrupted from the brine circuit 10 but is connected to the hot water circuit 22. In this way, the hot water in the hot water circuit 22 flows into both of the heater 17 and the air-conditioning heat exchanger 18, and the brine in the brine circuit 10 flows only into the cooler 15 of the front air-conditioning unit 13. Accordingly, at this time, the air-conditioning heat exchanger 18 performs a heating operation.

In the dehumidifying/heating operation, when operation of the rear air-conditioning unit 14 is not necessary, the blower 19 may be stopped.

In winter season, to enhance the heating capacity, during the dehumidifying/heating operation, the air amount ratio of the warm air may be increased by increasing the opening degree of the air-mixing door 29, and the air amount of the blowers 16 and 19 in the front and the rear air-conditioning units 13 and 14 may be increased.

According to this embodiment, when the maximum heating operation is set in winter season, the heating capacity can be improved by introducing the hot water also into the cooler 15. That is, when the maximum heating operation is set, the electromagnetic clutch 8 is turned off, and the compressor 3 is stopped to stop the refrigeration cycle 2. On the other hand, simultaneously, the valve element 20*b* of the cool water/hot water switching valve 20 is operated to the position of FIG. 8B, the air-conditioning heat exchanger 18 is interrupted from the brine circuit 10 but is connected to the hot water circuit, and the cooler 15 is also connected to the hot water circuit 22.

In this way, the hot water in the hot water circuit 22 flows through the heater 17 and the air-conditioning heat exchanger 18 in parallel, and the hot water further flows into the cooler 15 along the following route. That is, the hot water flows in the route passing through the engine 9, the cooling water/hot water switching valve 20, the cooler 15, and the inlet side of the water pump 23 in this order, and the cooler 15 functions as the heater.

In this way, because the hot water in the hot water circuit 22 circulates through the cooler 15 of the front air-conditioning unit 13, the heater 17, and the air-conditioning heat exchanger 18 of the rear air-conditioning unit 14, the warm air heated by three heat exchangers 15, 17, and 18 is blown from the front side and the rear side of the passenger compartment to heat the passenger compartment.

In the above-described embodiment, the heat-accumulating tank 21 is disposed at the inlet side of the common passage portion 18*a* of the air-conditioning heat exchanger 18 in the rear air-conditioning unit 14; however, the heat-accumulating tank 21 may be disposed at the outlet side of the common passage portion 18*a* of the air-conditioning heat exchanger 18.

Figure 10:
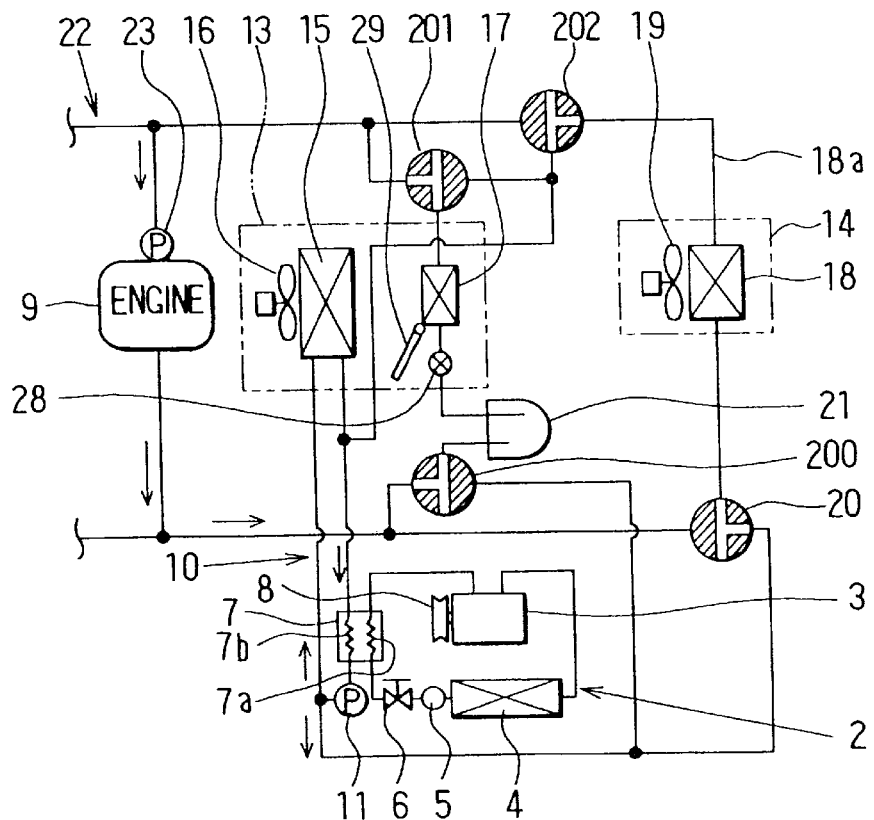
FIG. 10 is a circuit view showing a refrigeration cycle, a hot water circuit, and a brine circuit in a third embodiment of the present invention.

A third embodiment of the present invention will be described with reference to FIG. 10.

In the second embodiment, the heat-accumulating tank 21 is disposed in the common passage portion 18*a* of the air-conditioning heat exchanger 18 in the rear air-conditioning unit 14; however, in the third embodiment, the heat-accumulating tank 21 is disposed at the side of the front air-conditioning unit 13. Accompanied with this, four cool water/hot water switching valves 20, 200, 201, and 202 are employed.

An operation of the third embodiment will be described. During the cooling operation in summer season, when the maximum cooling capacity is performed, the four cool water/hot water switching valves 20, 200, 201, and 202 are operated to positions to form a brine passage of (1) a closed circuit passing through the water pump 11, the cooler 15 of the front air-conditioning unit 13, and the brine-refrigerant heat exchanger 7 in this order, (2) a closed circuit passing through the water pump 11, the cool water/hot water switching valve 20, the air-conditioning heat exchanger 18, the cool water/hot water switching valve 202, and the brine-refrigerant heat exchanger 7 in this order, and (3) a closed circuit passing through the water pump 11, the cool water/hot water switching valve 200, the heat-accumulating tank 21, the opening and closing valve 28 of the front air-conditioning unit 13, the heater 17, the cool water/hot water switching valve 201, and the brine-refrigerant heat exchanger 7 in this order.

Thus, the brine is introduced into all of three heat exchangers 15, 17, and 18, so that the cooling operation of the passenger compartment can be performed.

In this case, similar to the second embodiment, the low-temperature brine having been accumulated in the heat-accumulating tank 21 during the last cooling operation circulates into the three heat exchangers 15, 17, and 18, so that responsibility of the cooling effect can be enhanced.

In the normal operations other than the maximum cooling operation, the four cool water/hot water switching valves 20, 200, 201, and 202 are operated to switch the brine passage of (1) a closed circuit passing through the water pump 11, the cooler 15 of the front air-conditioning unit 13, and the brine-refrigerant heat exchanger 7 in this order and (2) a closed circuit passing through the water pump 11, the cool water/hot water switching valve 20, the air-conditioning heat exchanger 18 of the rear air-conditioning unit 14, the cool water/hot water switching valve 202, and the brine-refrigerant heat exchanger 7 in this order, and the hot water passage of (3) a closed circuit passing through the engine 9, the cool water/hot water switching valve 200, the opening and closing valve 28 of the heat-accumulating tank 21, the front air-conditioning unit 13, the heater 17, the cool water/hot water switching valve 201, and the water pump 23 in this order.

Thus, the low-temperature brine circulates into the cooler 15 and the air-conditioning heat exchanger 18 to cool the blown-air, and the hot water is introduced into the heater 15 of the front air-conditioning unit 13 so that the temperature of the blown-air of the front air-conditioning unit 13 can be controlled while being re-heated by the heater 15.

In an intermediate season such as spring and fall, a dehumidifying/heating operation is set based on operations of switches on the air-conditioning operation panel 30 and sensor detection signals. In the dehumidifying/heating operation, when the temperature of the air blown into the passenger compartment is on a comparatively low temperature side, which is lower than a predetermined temperature, an operation of each component is set in the same manner as in the normal cooling operation.

During the dehumidifying/heating operation, when the temperature of the air blown into the passenger compartment is on a comparatively high temperature side, which is higher than the predetermined temperature, the air-conditioning heat exchanger 18 of the rear air-conditioning unit 14 is interrupted from the brine circuit 10 but is connected to the hot water circuit 22 by the four cool water/hot water switching valves 20, 200, 201, and 202 to form (1) a closed circuit passing through the water pump 11, the cooler 15 of the front air-conditioning unit 13, and the brine-refrigerant heat exchanger 7 in this order, (2) a closed circuit passing through the engine 9, the cool water/hot water switching valve 20, the air-conditioning heat exchanger 18 of the rear air-conditioning unit 14, the cool water/hot water switching valve 202, and the water pump 23 in this order, and (3) a closed circuit passing through the engine 9, the cool water/hot water switching valve 200, the heat-accumulating tank 21, the opening and closing valve 28 of the front air-conditioning unit 13, the heater 17, the cool water/hot water switching valve 201, and the water pump 23 in this order.

While the hot water passes in the closed circuits of (2) and (3), the hot water of the hot water circuit 22 flows into both of the heater 17 and the air-conditioning heat exchanger 18. The brine of the brine circuit 10 flows only into the cooler 15 of the front air-conditioning unit 13. Therefore, at this time, the air-conditioning heat exchanger 18 performs a heating operation.

In summer season, to enhance the heating capacity, during the above-described dehumidifying/heating operation, the air amount ratio of the warm air may be increased by increasing the opening degree of the air-mixing door 29, and each air amount of the blowers 13 and 19 of the front and the rear air-conditioning units 13 and 14 may be increased.

When the maximum heating operation is set in winter season, the hot water may be introduced also into the cooler 15 to improve the heating capacity. That is, when the maximum heating operation is set, the electromagnetic clutch 8 is turned off to stop the compressor 3, and the refrigeration cycle 2 is stopped. On the other hand, simultaneously, the four cool water/hot water switching valves 20, 200, 201, and 202 are switched to form hot water side closed circuits including (1) a closed circuit passing through the engine 9, the cool water/hot water switching valve 20, the air-conditioning heat exchanger 18 of the rear air-conditioning unit 14, the cool water/hot water switching valve 202, and the water pump 23 in this order, (2) a closed circuit passing through the engine 9, the cool water/hot water switching valve 200, the heat-accumulating tank 21, the opening and closing valve 28 of the front air-conditioning unit 13, the heater 17, the cool water/hot water switching valve 201, and the water pump 23 in this order, and (3) a closed circuit passing through the engine 9, the cool water/hot water switching valve 20, the cooler 15 of the front air conditioning unit 13, the cool water/hot water switching valve 202, and the water pump 23.

Therefore, the hot water flows into all of the cooler 15, the heater 17 and the air-conditioning heat exchanger 18, and the cooler 15 functions as a heater. In this way, the warm air heated by three heat exchangers 15, 17, and 18 can be blown out from the front side and the rear side of the passenger compartment to heat the passenger compartment.

In the third embodiment, the cool water/hot water switching valve 202 may be omitted, the cool water/hot water outlet side of the air-conditioning heat exchanger 18 may be directly connected to the inlet side of the water pump 9, and the cool water/hot water outlet side of the cooler 15 may be connected to the inlet side of the water pump 9 through the cool water/hot water switching valve 201.

Figure 11:
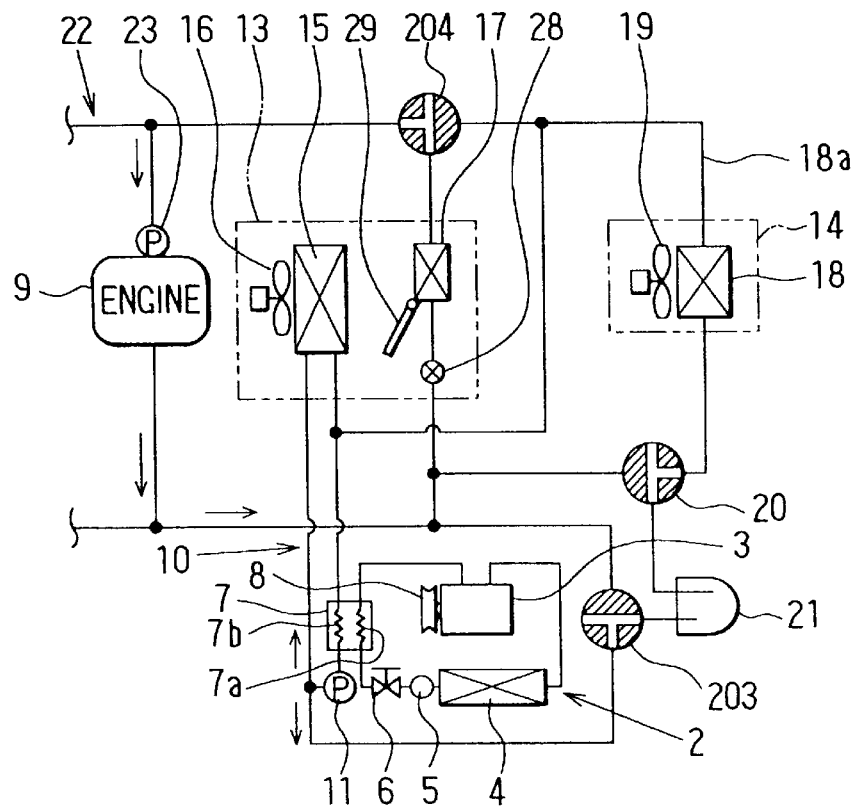
FIG. 11 is a circuit view showing a refrigeration cycle, a hot water circuit, and a brine circuit in a fourth embodiment of the present invention.

A fourth embodiment of the present invention will be described with reference to FIG. 11.

In the second embodiment, the heat-accumulating tank 21 is disposed in the common passage portion 18a of the air-conditioning heat exchanger 18 of the rear air-conditioning unit 14, and in the third embodiment, the heat-accumulating tank 21 is disposed at the side of the heater 17 of the front air-conditioning unit 13; however, in the fourth embodiment, the heat-accumulating tank 21 is disposed at a middle position between the front air-conditioning unit 13 and the rear air-conditioning unit 14. That is, in this embodiment, the cool water/hot water switching valves 203 and 20 are provided at both of the inlet side and the outlet side, respectively. The cool water/hot water switching valve 203 at the inlet side selectively connects the inlet side of the heat-accumulating tank 21 to either the brine circuit 10 or the hot water circuit 22. The cool water/hot water switching valve 20 at the outlet side selectively connects the outlet side of the heat-accumulating tank 21 to either the air-conditioning heat exchanger 18 and the heater 17.

Further, there is provided a cool water/hot water switching valve 204 for switching outlet sides of the cooler 15, the heater 17 and the air-conditioning heat exchanger 18 and the inlet side of the water pump 23.

Next, an operation of the fourth embodiment will be described. During the cooling operation in summer season, the refrigeration 2 is operated, and the three cool water/hot water switching valves 20, 203, and 204 are operated to positions to form brine passages including (1) a closed circuit passing through the water pump 11, the cooler 15 of the front air-conditioning unit 13, and the brine-refrigerant heat exchanger 7 in this order, and (2) a closed circuit passing through the water pump 11, the cool water/hot water switching valve 203, the heat-accumulating tank 21, the cool water/hot water switching valve 20, the air-conditioning heat exchanger 18 of the rear air-conditioning unit 14, and the brine-refrigerant heat exchanger 7.

In this way, because the brine circulates in the brine circuit 10 while flowing through both of the cooler 15 and the air-conditioning heat exchanger 18 by the operation of the water pump 11, blown-air of the blowers 16 and 19 are cooled by the cooler 15 and the air-conditioning heat exchanger 18 to cool the front-side portion and the rear-side portion in the passenger compartment.

In the other operations than the maximum cooling operation, the opening and closing valve 28 is opened, and the hot water circulates into the heater 17 of the front air-conditioning unit 13. In this way, the air amount ratio of the cool air and the warm air is adjusted by the opening degree of the air-mixing door 29, so that the temperature of the air blown into the passenger compartment can be adjusted.

At the start of the cooling operation, the low-temperature brine in the heat-accumulating tank 21 circulates into the cooler 15 and the air-conditioning heat exchanger 18, so that the cooling capacity at the start of the cooling operation can be increased.

During the maximum cooling operation, the opening and closing valve 28 is closed, the opening degree of the air-mixing door 29 is set to zero (the warm air amount is zero).

Further, during the maximum cooling operation, the low-temperature brine may circulate into the heater 17, so that the heater 17 can function as a cooler.

That is, in this maximum cooling operation mode, the three cool water/hot water switching valves 20, 203, 204 are operated to from brine passages including (1) a closed circuit passing through the water pump 11, the cooler 15 of the front air-conditioning unit 13, and the brine-refrigerant heat exchanger 7 in this order, (2) a closed circuit passing through the water pump 11, the cool water/hot water switching valve 203, the heat-accumulating tank 21, the cool water/hot water switching valve 20, the air-conditioning heat exchanger 18 of the rear air-conditioning unit 14, and the brine-refrigerant heat exchanger 7 in this order, and (3) a closed circuit passing through the water pump 11, the cool water/hot water switching valve 203, the heat-accumulating tank 21, the cool water/hot water switching valve 20, the opening and closing valve 28 of the front air-conditioning unit 13, the heater 17, the cool water/hot water switching valve 204, and the brine-refrigerant heat exchanger 7 in this order.

Thus, the brine is introduced into all of three heat exchangers 15, 17, and 18, so that the cooling operation of the passenger compartment can be performed.

In an intermediate season such as spring and fall, a dehumidifying/heating operation is set. In the dehumidifying/heating operation, when the temperature of the air blown into the passenger compartment is on a comparatively low temperature side, which is lower than a predetermined temperature, an operation of each component is set in the same manner as in the normal cooling operation other than the maximum cooling operation.

In the dehumidifying/heating operation, when the temperature of the air blown into the passenger compartment is on a comparatively high temperature side, which is higher than the predetermined temperature, the air-conditioning heat exchanger 18 of the rear air-conditioning unit 14 is interrupted from the brine circuit 10 but is connected to the hot water circuit 22 by the three cool water/hot water switching valves 20, 203, and 204 to form (1) a closed circuit passing through the water pump 11, the cooler 15 of the front air-conditioning unit 13, and the brine-refrigerant heat exchanger 7 in this order, (2) a closed circuit passing through the engine 9, the opening and closing valve 28, the heater 17 of the front air-conditioning unit 13, the cool water/hot water switching valve 204, and the water pump 23 in this order, and (3) a closed circuit passing through the engine 9, the cool water/hot water switching valve 203, the heat-accumulating tank 21, the cool water/hot water switching valve 20, the air-conditioning heat exchanger 18 of the rear air-conditioning unit 14, the cool water/hot water switching valve 204, and the water pump in this order.

While the hot water passes in the closed circuits of (2) and (3), the hot water of the hot water circuit 22 flows into both of the heater 17 and the air-conditioning heat exchanger 18. The brine of the brine circuit 10 flows only into the cooler 15 of the front air-conditioning unit 13. Therefore, at this time, the air-conditioning heat exchanger 18 performs a heating operation.

In winter season, to enhance the heating capacity, during the dehumidifying/heating operation, the air amount ratio of the warm air may be increased by increasing the opening degree of the air-mixing door 29, and the air amount of the blowers 16 and 19 in the front and the rear air-conditioning units 13 and 14 may be increased.

Further, when the maximum heating operation is set in winter season, the heating capacity can be improved by introducing the hot water also into the cooler 15. That is, when the maximum heating operation is set, the electromagnetic clutch 8 is turned off, and the compressor 3 is stopped to stop the refrigeration cycle 2. On the other hand, simultaneously, the cool water/hot water switching valve 20, 203, and 204 to form three hot water closed circuits including (1) a closed circuit passing through the engine 9, the cool water/hot water switching valve 203, the heat-accumulating tank 21, the cool water/hot water switching valve 20, the air-conditioning heat exchanger 18 of the rear air-conditioning unit 14, the cool water/hot water switching valve 204, and the water pump 23 in this order, (2) a closed circuit passing through the engine 9, the cool water/hot water switching valve 28, the heater 17 of the front air-conditioning unit 13, the cool water/hot water switching valve 204, and the water pump 23 in this order, and (3) a closed circuit passing through the engine 9, the cool water/hot water switching valve 203, the cooler 15 of the front air-conditioning unit 13, the cool water/hot water switching valve 204, and the water pump 23 in this order.

In this way, the hot water flows into all of the cooler 15, the heater 17 and the air-conditioning heat exchanger 18, and the cooler 15 functions as a heater. Therefore, the warm air heated by three heat exchangers 15, 17, and 18 is blown out from the front side and the rear side of the passenger compartment to heat the passenger compartment.

In each of the above-described second to fourth embodiments, during an operation mode (dehumidifying/heating mode, or heating mode) where the hot water circulates into the heat-accumulating tank 21, the high-temperature hot water can be accumulated in the heat-accumulating tank 21; and therefore, by using the high-temperature hot water in the heat-accumulating tank 21, it is possible to accelerate the warm-up operation of the engine 9 or the rise of the heating operation (quick heating operation).

Figure 12:
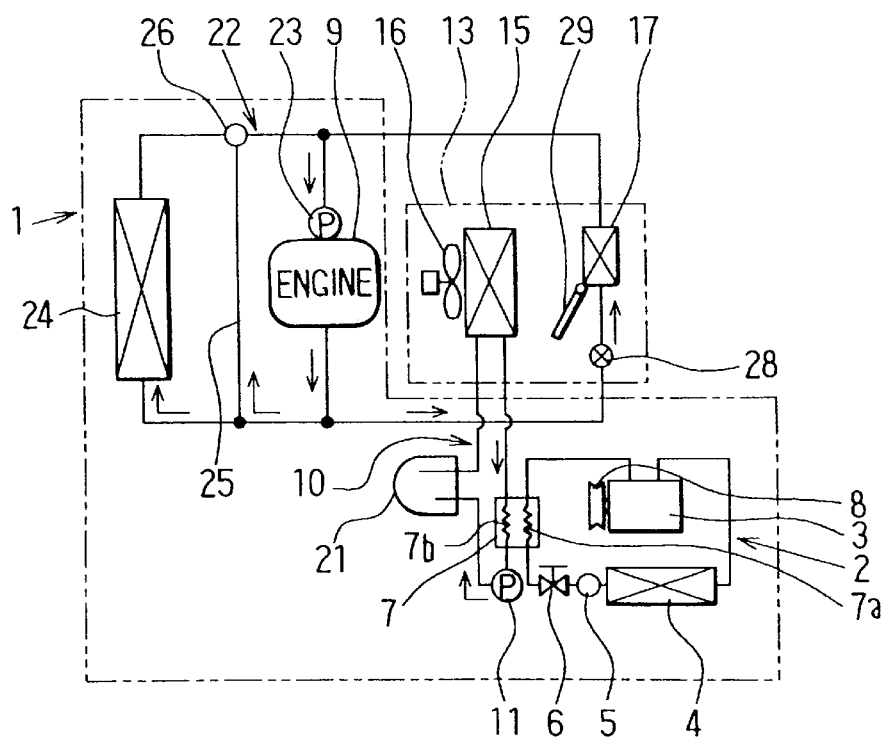
FIG. 12 is a circuit view showing a refrigeration cycle, a hot water circuit, and a brine circuit in the fifth embodiment of the present invention.

A fifth embodiment of the present invention will be described with reference to FIG. 12.

In the fifth embodiment, the present invention is employed in an air conditioning apparatus equipped with only the front air-conditioning unit 13 and without the rear air-conditioning unit 14. In this embodiment, the heat-accumulating tank 21 is disposed between the water pump 11 of the brine circuit 10 and the cooler 15. In this way, the responsibility at the start of the cooling operation can be improved.

In each of the above-described embodiments, there is employed the air-mixing type in which the air-mixing door 29 for adjusting a ratio of the amount of the cool air and the amount of the warm air is provided in the air flow passage in the front air-conditioning unit 13 to adjust a temperature of the blown-air; however, there may be employed a hot water flow amount adjusting type in which the opening and closing valve 28 is constructed as a flow control valve for controlling the hot water amount and the amount of the hot water flowing into the heater 17 by the opening degree of the flow control valve to adjust the temperature of the blown-air.

Further, in the above-described first embodiment, to control the capacity of the refrigeration cycle 2, there is employed a type in which the operation of the compressor 3 is intermitted by intermitting the electric current to the electromagnetic clutch 8. That is, the capacity changing means for variably changing the capacity of the refrigeration cycle 2 employs the combination of the compressor 3 and the electromagnetic clutch 8; however, it is not limited to this type, the compressor 3 may be of the capacity variable type and the capacity of the compressor 3 may be electrically controlled according to a control signal from the control unit 30 to control the capacity of the refrigeration cycle 2.

Further, in each of the above-described embodiments, the compressor 3 is actuated by the engine 3; however, as for an electric vehicle, the compressor 3 may be of the electric type actuated by the motor. In this case, a rotational speed of the electric compressor 3 may be electrically controlled by an invertor so that the capacity of the refrigeration cycle 2 can be controlled.

As for a hybrid vehicle having both of an engine running the vehicle and a motor for running the vehicle, or an electric vehicle having only a motor for running the vehicle and without having the engine, an electric water pump for pumping the hot water circulating into the heater 17 and the like may be additionally provided in the hot water circuit 22.

Further, the present invention may be employed for the other purposes than the vehicle.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A brine type air-conditioning apparatus for performing an air-conditioning of a compartment, comprising:
    a refrigeration cycle having a brine-refrigerant heat exchanger for performing heat-exchange between refrigerant composed of flammable refrigerant and brine, in which the refrigerant circulates and is evaporated while absorbing heat from the brine in said brine-refrigerant heat exchanger;
    means for forming a brine circuit in which the brine cooled in said brine-refrigerant heat exchanger circulates;
    means for forming a hot water circuit in which hot water flows;
    a first air-conditioning unit for performing an air-conditioning of a first area in said compartment;
    a second air-conditioning unit for performing an air-conditioning of a second area in said compartment;
    a cooler disposed in said first air-conditioning unit, for cooling conditioned air by using the brine in said brine circuit;
    a heater disposed at an air downstream side of said cooler in said first air conditioning unit, for heating conditioned air by using the hot water in said hot water circuit;
    a first blower disposed in said first air-conditioning unit, for blowing conditioned air;
    an air-conditioning heat exchanger disposed in said second air-conditioning unit, for cooling conditioned air by using the brine in the brine circuit and for heating conditioned air by using the hot water;
    a second blower disposed in said second air-conditioning unit, for blowing conditioned air;
    capacity changing means for variably changing a capacity of said refrigeration cycle to vary a temperature of the brine in said brine circuit;
    heating amount control means for controlling a heating amount by said heater; and
    a valve for switching a flow into said air-conditioning heat exchanger, between the brine in said brine circuit and the hot water in said hot water circuit, said valve also being for adjusting an amount of the flow into said air-conditioning heat exchanger; wherein,
    when a target temperature of air to be blown into said compartment is lower than a predetermined temperature, the capacity of said refrigeration cycle is variably changed by said capacity changing means to perform a temperature control of low-temperature side in said first and second air-conditioning units, and
    after the target temperature of air to be blown into said compartment is increased up to the predetermined temperature, a temperature control of high-temperature side is performed in said first air-conditioning unit by said heating amount control means, and a temperature control of high-temperature side is performed in said second air-conditioning unit by said valve.

2. A brine type air-conditioning apparatus according to claim 1, further comprising:
    calculating means for calculating the target temperature of the air to be blown into said compartment;
    a setting unit for setting the predetermined temperature;
    determining means for determining whether or not the target temperature of the air to be blown into said compartment is higher than said predetermined temperature; and
    a control unit for performing the temperature control of the low-temperature side while the target temperature of the air to be blown into said compartment is lower than the predetermined temperature and performs the temperature control of the high-temperature side after the target temperature of the air to be blown into said compartment is increased up to the predetermined temperature.

3. A brine type air-conditioning apparatus according to claim 2, further comprising:
    a humidity sensor for detecting a humidity in said compartment; wherein,
    said setting unit sets a dehumidifying limit temperature determined according to the humidity detected by said humidity sensor as the predetermined temperature, and
    said control means controls the capacity of said refrigeration cycle by said capacity changing means such that a temperature of said cooler is maintained at said dehumidifying limit temperature when the temperature control of the high-temperature side is performed.

4. A brine type air-conditioning apparatus according to claim 1, wherein,
    said brine type air-conditioning apparatus is mounted on a vehicle having an engine and a passenger compartment,
    said first air-conditioning unit is disposed at a front portion in said passenger compartment to perform an air-conditioning of said front portion,
    said second air-conditioning unit is disposed at a rear portion in said passenger compartment to perform an air-conditioning of said rear portion, and
    said hot water is cooling water for cooling said engine.

5. A brine type air-conditioning apparatus according to claim 1, further comprising:
    a heat-accumulating tank for accumulating low-temperature brine in said brine circuit, wherein the low-temperature brine in said heat-accumulating tank circulates into said cooler and said air-conditioning heat exchanger at a start of a cooling operation.

6. A brine type air-conditioning apparatus according to claim 5, further comprising:

means for forming a common passage portion through which both of the brine in said brine circuit and the hot water in said hot water circuit flow into said air-conditioning heat exchanger; wherein, said heat-accumulating tank is disposed in said common passage portion, and said heat-accumulating tank is for accumulating both of the low-temperature brine of said brine circuit and the high-temperature hot water of said hot water circuit.

7. A brine type air-conditioning apparatus according to claim 6, wherein, said heat-accumulating tank is disposed at an inlet side of said common passage portion, and said brine type air-conditioning apparatus further comprises:

a switching valve disposed at an inlet side of said heat-accumulating tank, for switching a flow into said heat-accumulating tank, between the brine in said brine circuit and the hot water in said hot water circuit.

8. A brine type air-conditioning apparatus according to claim 5, wherein, said heat-accumulating tank is disposed at an inlet side of said heater, and during a cooling operation, the brine in said brine circuit circulates into said heater through said heat-accumulating tank and also circulates into said cooler and said air-conditioning heat exchanger.

9. A brine type air-conditioning apparatus according to claim 5, further comprising:

an inlet-side valve disposed at an inlet side of said heat-accumulating tank, for selectively connecting said inlet side of said heat-accumulating tank to one of said brine circuit and said hot water circuit; and an outlet-side valve disposed at an outlet side of said heat-accumulating tank, for selectively connecting said outlet side of said heat-accumulating tank to one of said air-conditioning heat exchanger and said heater.

10. A brine type air-conditioning apparatus according to claim 5, wherein, during a cooling operation, the brine in said brine circuit circulates into all of said cooler, said heater, and said air-conditioning heat exchanger.

11. A brine type air-conditioning apparatus according to claim 5, wherein, during a heating operation, the hot water in said hot water circuit circulates into all of said cooler, said heater, and said air-conditioning heat exchanger.

* * * * *